(12) United States Patent
Walker et al.

(10) Patent No.: US 9,430,860 B2
(45) Date of Patent: *Aug. 30, 2016

(54) REACTIVE VIRTUAL ENVIRONMENT

(71) Applicant: Cisco Technology, Inc., San Jose, CA (US)

(72) Inventors: Douglas Jay Walker, Raleigh, NC (US); Lisa Louise Bobbitt, Cary, NC (US); Henry William Morrison, IV, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 111 days.

This patent is subject to a terminal disclaimer.

(21) Appl. No.: 14/339,788

(22) Filed: Jul. 24, 2014

(65) Prior Publication Data

US 2014/0333652 A1 Nov. 13, 2014

Related U.S. Application Data

(63) Continuation of application No. 14/014,853, filed on Aug. 30, 2013, now Pat. No. 8,817,022, which is a continuation of application No. 12/062,292, filed on Apr. 3, 2008, now Pat. No. 8,531,447.

(51) Int. Cl.
| | |
|---|---|
| *G06T 11/60* | (2006.01) |
| *A63F 13/00* | (2014.01) |
| *G06Q 10/10* | (2012.01) |
| *G06T 17/10* | (2006.01) |
| *G06Q 10/00* | (2012.01) |
| *G06T 11/00* | (2006.01) |

(52) U.S. Cl.
CPC .............. *G06T 11/60* (2013.01); *A63F 13/00* (2013.01); *G06Q 10/00* (2013.01); *G06Q 10/10* (2013.01); *G06Q 10/103* (2013.01); *G06T 11/001* (2013.01); *G06T 17/10* (2013.01); *G06T 2207/30196* (2013.01)

(58) Field of Classification Search
None
See application file for complete search history.

(56) References Cited

U.S. PATENT DOCUMENTS

| | | |
|---|---|---|
| 5,987,401 A | 11/1999 | Trudeau et al. |
| 6,092,048 A | 7/2000 | Nakaoka |
| 6,349,327 B1 | 2/2002 | Tang et al. |
| 7,069,192 B1 | 6/2006 | Freitag |
| 7,792,829 B2 | 9/2010 | Brill et al. |
| 7,865,382 B2 | 1/2011 | Menon et al. |

(Continued)

OTHER PUBLICATIONS

Voida et al. "Integrating Virtual and Physical Context to Support Knowledge Workers" pp. 74-79; 2002 IEEE.

(Continued)

*Primary Examiner* — Maurice L McDowell, Jr.
(74) *Attorney, Agent, or Firm* — Edell, Shapiro & Finnan, LLC

(57) ABSTRACT

A system (and corresponding method) is provided that enables virtual spaces to be created based upon user activity and populated with users associated with, interested in or active within the same areas as the user, thus facilitating serendipitous interactions and exchange of knowledge. The system dynamically binds user representations (e.g., avatars, links) into a virtual space that is associated with an activity or topic. Essentially, the system is capable of dynamically gathering or generating representations of users associated with a workflow or tasks within an activity, project or topic thereby enhancing collaboration between users with regard to communications as well as generation and sharing of data.

21 Claims, 13 Drawing Sheets

(56) References Cited

U.S. PATENT DOCUMENTS

| | | | |
|---|---|---|---|
| 8,095,595 | B2 | 1/2012 | Bobbitt et al. |
| 8,531,447 | B2 | 9/2013 | Walker et al. |
| 2003/0125927 | A1 | 7/2003 | Seme |
| 2004/0117449 | A1 | 6/2004 | Newman et al. |
| 2004/0128350 | A1 | 7/2004 | Topfl et al. |
| 2004/0179037 | A1 | 9/2004 | Blattner et al. |
| 2004/0250201 | A1 | 12/2004 | Caspi |
| 2005/0027800 | A1 | 2/2005 | Erickson et al. |
| 2005/0165624 | A1 | 7/2005 | Shelton et al. |
| 2005/0264648 | A1 | 12/2005 | Ivashin et al. |
| 2006/0023915 | A1 | 2/2006 | Aalbu et al. |
| 2006/0069726 | A1 | 3/2006 | McKibben et al. |
| 2006/0136441 | A1 | 6/2006 | Fujisaki |
| 2007/0016647 | A1 | 1/2007 | Gupta et al. |
| 2007/0130257 | A1 | 6/2007 | Bedi et al. |
| 2007/0239869 | A1 | 10/2007 | Raghav et al. |
| 2008/0052358 | A1 | 2/2008 | Beaven et al. |
| 2008/0222295 | A1 | 9/2008 | Robinson et al. |
| 2008/0281922 | A1 | 11/2008 | Renshaw et al. |
| 2008/0301232 | A1 | 12/2008 | Facemire et al. |
| 2009/0119368 | A1 | 5/2009 | O'Sullivan et al. |
| 2009/0119604 | A1 | 5/2009 | Simard et al. |
| 2009/0222742 | A1 | 9/2009 | Pelton et al. |
| 2009/0241049 | A1 | 9/2009 | Bates et al. |
| 2009/0251457 | A1 | 10/2009 | Walker et al. |
| 2009/0276492 | A1 | 11/2009 | Bobbitt et al. |

OTHER PUBLICATIONS

Alarcon et al. "Intelligent Awareness in Support of Collaborative Virtual Work Groups", Lecture Notes in Computer Science, 2002, pp. 1, 3-4.

"Second Life," [Online]. Retrieved from the internet: <www.secondlife.com>. Dec. 29, 2008. 1 pg.

Kirsh, D. "Adaptive Rooms, Virtual Collaboration." Dec. 29, 2008. <http://interactivity.ucsd.edu/articles/CoopBuildings/published-version.html>, 12 pgs.

AMI Consortium. "Dynamic Summarization Overview", [Online] Retrieved from the Internet: <www.amiproject.org/showcase/audio-speech-processing/dynamic-summarization.>, (Jan. 7, 2009), 1 pg.

"The Future in Gear", PCMag.com, [Online] Retrieved from the Internet: <http://www.pcmag.com/article2/0,2817,417141,00.asp>. Sep. 3, 2002, 18 pgs.

"IBM. Sametime", [Online]. Retrieved from the Internet: <http://publib.boulder.ibm.com/infocenter/sametime/v7r5m1/index.jsp?topic=/com.ib>, (Jan. 7, 2009), 1 pg.

"Avatars! Exploring and Building Virtual Worlds on the Internet", Digital Space. Avatars. [Online] Retrieved from the Internet: <http://www.digitalspace.com/avatars/book/chus/chus1.htm>, (Jan. 7, 2009), 10 pgs.

"HP. Virtual Rooms", Frequently Asked Purchasing Questions, Dec. 29, 2008. <http://h10076.www1.hp.com/education/hpvr/hpvr_orderfaq.htm>, 1 pg.

"Microsoft Office Live Meeting", Help for Live Meeting 2007, [Online]. Retrieved from the Internet: <http://office.microsoft.com/en-us/livemeeting/FX102425331033.aspx>, (Dec. 29, 2008), 1 pg.

Chernich, R, et al., "Virgil-Providing Institutional Access to a Repository of Access Grid Session", Proceedings of the 11th European Conference on Research and Advanced Technology for Digital Libraries (ECDL07), Budapest, Hungary, Sep. 16-21, 2007, 12 pgs.

Geyer, W., et al., "Making multimedia meeting records more meaningful", Proceedings of the 2003 International Conference on Multimedia and Expo (ICME '03), vol. 2, Baltimore, Maryland, Jul. 6-9, 2003, 669-672.

Greenhalgh, C., et al., "Applications of temporal links: recording and replaying virtual environments", Proceedings of the IEEE Virtual Reality Conference 2002 (VR 2002), Orlando, Florida, Mar. 24-28, 2002, 8 pgs.

Jatowt, A. et al., "Web Page Summarization Using Dynamic Content", Proceedings of the 13th international World Wide Web conference on Alternate track papers & posters (WWW Alt. '04), New York, NY, (2004), 344-345.

Voida, S., et al., "Supporting Collaboration in a Context-Aware Office Computing Environment", 4th International Conference on Ubiquitous Computing (UbiComp 2002), Gothenburg, Sweden, (2002), 19 pgs.

U.S. Appl. No. 12/041,218, Final Office Action mailed Jun. 13, 2011, 13 pgs.

U.S. Appl. No. 12/041,218, Non Final Office Action mailed Nov. 29, 2010, 11 pgs.

U.S. Appl. No. 12/041,218, Response filed Mar. 29, 2011 to Non Final Office Action mailed Nov. 29, 2011, 11 pgs.

U.S. Appl. No. 12/062,292, Response filed Apr. 29, 2013 to Non Final Office Action mailed Feb. 21, 2013, 7 pgs.

U.S. Appl. No. 12/062,292, Examiner Interview Summary mailed May 7, 2013, 3 pgs.

U.S. Appl. No. 12/062,292, Examiner Interview Summary mailed Nov. 3, 2011, 3 pgs.

U.S. Appl. No. 12/062,292, Final Office Action mailed Jul. 28, 2011, 16 pgs.

U.S. Appl. No. 12/062,292, Non Final Office Action mailed Jan. 21, 2011, 13 pgs.

U.S. Appl. No. 12/062,292, Non Final Office Action mailed Feb. 21, 2013, 5 pgs.

U.S. Appl. No. 12/062,292, Notice of Allowance mailed May 10, 2013, 8 pgs.

U.S. Appl. No. 12/062,292, Response filed May 23, 2011 to Non Final Office Action mailed Jan. 21, 2011, 8 pgs.

U.S. Appl. No. 12/062,292, Response filed Oct. 28, 2011 to Final Office Action mailed Jul. 28, 2011, 9 pgs.

U.S. Appl. No. 12/112,717, Examiner Interview Summary Filed Mar. 28, 2011, 1 pg.

U.S. Appl. No. 12/112,717, Non Final Office Action mailed Apr. 30, 2010, 9 pgs.

U.S. Appl. No. 12/112,717, Notice of Allowance mailed May 13, 2011, 7 pgs.

U.S. Appl. No. 12/112,717, Notice of Allowance mailed Sep. 8, 2011, 5 pgs.

U.S. Appl. No. 12/112,717, Response filed Mar. 28, 2011 to Non Final Office Action mailed Dec. 3, 2010, 9 pgs.

U.S. Appl. No. 12/112,717, Response filed Sep. 30, 2010 to Non Final Office Action mailed Apr. 30, 2010, 6 pgs.

U.S. Appl. No. 12/112,717, Non Final Office Action mailed Dec. 3, 2010, 6 pgs.

REACTIVE VIRTUAL ENVIRONMENT

CROSS-REFERENCE TO RELATED APPLICATIONS

This application is a continuation of U.S. patent application Ser. No. 14/014,853, filed Aug. 30, 2013, which in turn is a continuation of U.S. patent application Ser. No. 12/062,292, filed Apr. 3, 2008, now U.S. Pat. No. 8,531,447, the entire contents of which are hereby incorporated by reference.

BACKGROUND

Virtual Reality (VR) refers to a technology which allows a user to interact within a computer-simulated environment. Generally, this computer-simulated environment can relate to a real or imagined scenario. Current VR environments are primarily visual experiences which are displayed either via a monitor or through specialized stereoscopic displays (e.g., goggles). In addition to visual effects, some simulations include additional sensory information, for example, audible or vibratory sensations. More advanced, 'haptic' systems now include tactile information, generally known as 'force feedback,' in many gaming applications.

Today, users most often interact with a VR environment by way of standard input devices such as a keyboard, mouse, joystick, trackball or other navigational device. As well, multimodal devices such as a specialized haptic wired glove are used to interact with and within the VR environment.

Recent developments in VR have been directed to three-dimensional (3D) gaming environments. Generally, a 'virtual world' is a computer-based simulated environment intended for its users to inhabit and interact via avatars. An 'avatar' refers to a digital representation of a user usually employed by way of the Internet to depict a user. An avatar can be a 3D model used in computer games, a two-dimensional image (e.g., icon) used within Internet and other community forums (e.g., chat rooms) as well as text constructs usually found on early legacy systems. Thus, presence within the 3D virtual world is most often represented in the form of two- or three-dimensional (3D) graphical representations of users (or other graphical or text-based avatars).

Today, nature and technology are equally integrated into 3D virtual worlds in order to enhance the reality of the environment. For example, actual topology, gravity, weather, actions and communications are able to be expressed within these virtual worlds thereby enhancing the reality of the user experience. Although early virtual world systems employed text as the means of communication, today, real-time audio (e.g., voice-over-Internet Protocol (VoIP)) is most often used to enhance communications.

Although the technological advances in graphics and communications have vastly improved the quality of the virtual worlds, these virtual environments have been centered around the gaming industry. As such, users control actions and the systems are preprogrammed with responses to those actions.

Somewhat similar to VR, 'Augmented Reality' (AR) most often relates to a field of computer research that describes the combination of real world and computer generated data. Conventionally, AR employs with the use of video imagery which is digitally processed and 'augmented' with the addition of computer-generated graphics. Similar to VR, traditional uses of AR have been primarily focused around the gaming industry.

Most often, conventional AR systems employed specially-designed translucent goggles. These goggles enable a user to see the real world as well as computer-generated images projected atop of the real world vision. These systems attempt to combine real world vision with a virtual world. Unfortunately, traditional systems fall short in their ability to leverage the vast amount of information and data now available to users.

DESCRIPTION

Overview

Figure 1:
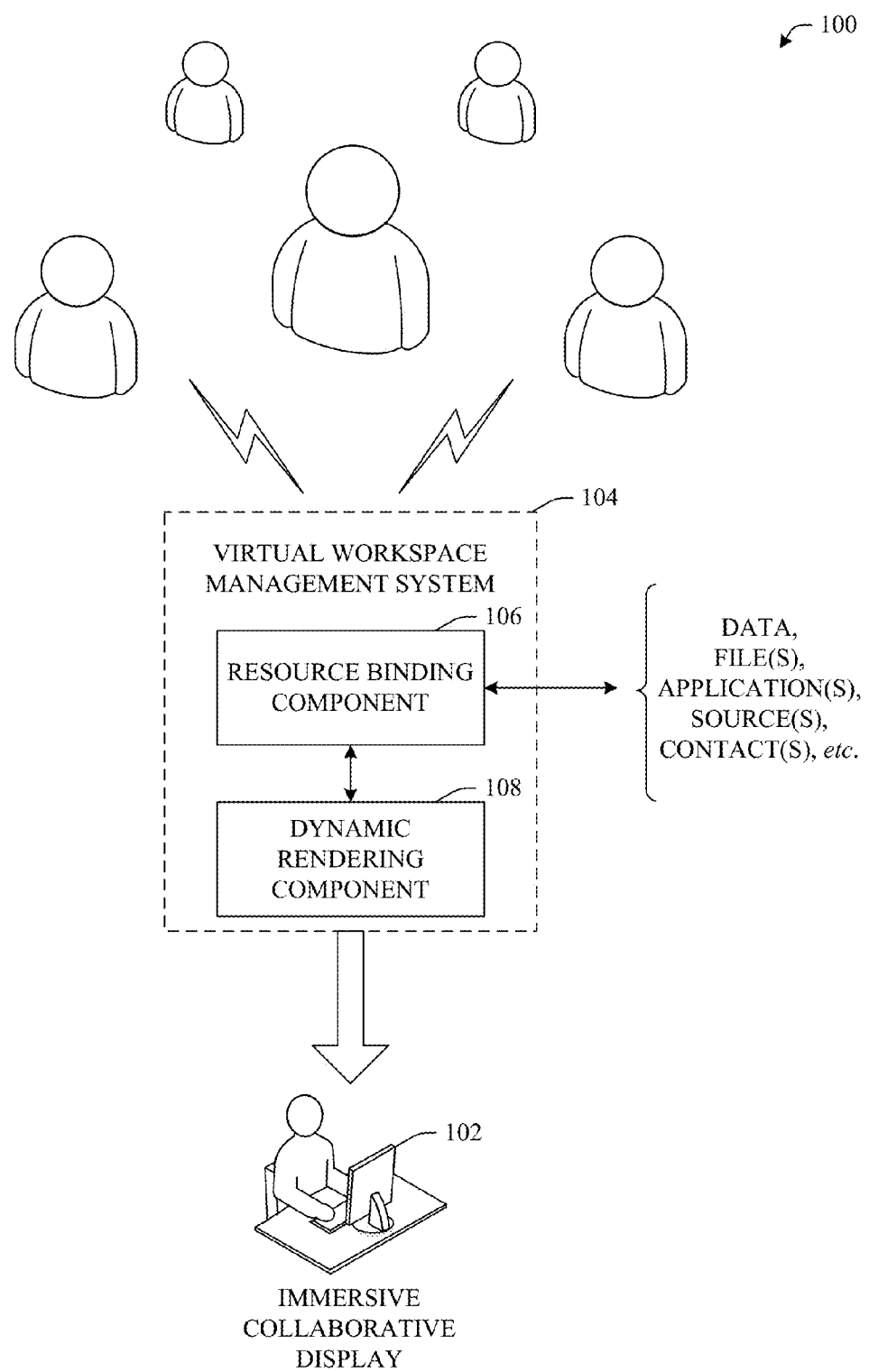
FIG. 1 illustrates an example virtual workspace management system that establishes an immersive collaborative display in accordance with an aspect of the specification.

The following presents a simplified overview of the specification in order to provide a basic understanding of some aspects of the specification. This overview is not an extensive overview of the specification. It is not intended to identify key/critical elements of the specification or to delineate the scope of the disclosure. Its sole purpose is to present some concepts of the specification in a simplified form as a prelude to the more detailed description that is presented later.

This specification discloses enablement of appropriate technology and processes to create the paradigm shift that moves real-life enterprises into the immersive world that was traditionally reserved for three-dimensional (3D) gaming technologies. Essentially, integrated data in an immersive collaboration environment can provide for activating changes in behaviors of persons—awareness is critical to efficiency and productivity. The concepts disclosed and claimed herein, in one aspect thereof, comprise a system (and corresponding method) that enables dynamic and real-time immersive collaborative environment between users. Effectively, virtual spaces are created automatically based on user activity and populated with users interested or active in the same areas (e.g., activities, workflows, tasks, projects . . . ) as the user, thus facilitating serendipitous interactions and exchange of knowledge. In particular aspects, the specification dynamically binds user representations (e.g., avatars, links) into a virtual space that is associated with an activity or topic. In embodiments, the activity or topic is associated with workflow in an enterprise or business scenario. Thus, the system is capable of dynamically gathering users, or representations of users, associated with a workflow or tasks within an activity, project or topic. These users become bound to a space or room thereby promoting communication and/or collaboration.

In addition to auto-gathering or collaborating user representations as a function of an activity, the system can automatically furnish virtual activity-related spaces with resources associated with an activity or context of the activity. 'Resources' can include data, sources, authors, applications, etc. Essentially, the system gathers users as well as resources associated to an activity in a two- (2D), two and a half- (2½D) or three-dimensional (3D) manner.

In still other aspects, in addition to generating a virtual space (or group of virtual spaces) related to an activity, the system can dynamically (e.g., in real- or near real-time) move user representations into the space(s). As users perform tasks, author documents, launch applications, etc., the space(s) can dynamically (e.g., in real- or near real-time) reconfigure to illustrate state or context of the space. In operation, the system employs monitoring mechanisms and considers content, contacts and context to dynamically reconfigure the spaces. It will be appreciated that the display can be rendered from a user perspective thereby further enhancing the rich, true-to-life and personalized experience.

To the accomplishment of the foregoing and related ends, certain illustrative aspects of the specification are described herein in connection with the following description and the annexed drawings. These aspects are indicative, however, of but a few of the various ways in which the principles of the specification can be employed and the subject specification is intended to include all such aspects and their equivalents. Other advantages and novel features of the specification will become apparent from the following detailed description of the specification when considered in conjunction with the drawings.

Brief Description of Example Embodiments

The specification is now described with reference to the drawings, wherein like reference numerals are used to refer to like elements throughout. In the following description, for purposes of explanation, numerous specific details are set forth in order to provide a thorough understanding of the subject specification. It may be evident, however, that the specification can be practiced without these specific details. In other instances, well-known structures and devices are shown in block diagram form in order to facilitate describing the specification.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

'Virtual Reality' (VR) environments are often referred to as 'immersive environments.' However, conventional immersive environments often lack an implication that 'reality' is being simulated within a digital space. In accordance with embodiments of the specification, an immersive environment can be a model of reality, as well as a complete fantasy user interface or abstraction where the users of the environment are virtually immersed within it. Essentially, the term 'immersion' suggests that a user experiences a presence within the virtual environment. This presence can be conveyed by rendering the immersive collaborative environment from the particular perspective or vantage point of a viewer. The success with which an immersive environment can actually immerse a user is dependent on many factors such as believable graphics (two-dimensional (2D), two and a half- (2½D) and three-dimensional (3D)), sound, interactive user engagement, among others.

Conventionally, immersive environments are currently used for multiplayer gaming where they offer a set of communication services along with gameplay and character development. Within these virtual worlds, people are most often represented as avatars and they must collaborate to achieve tasks. The environment or virtual world itself is most often rich and provides visual and auditory cues that direct the players to complete certain tasks. Contrary to conventional systems, the specification herein discloses systems (and corresponding methodologies) that dynamically reconfigure virtual spaces in accordance with user actions. In other words, monitoring techniques are employed to dynamically adapt the immersive environment in accordance with user action, content, context, etc., rather than predetermined reconfigurations as with conventional systems. No user intervention is required in accordance with aspects of the subject specification. Additionally, even if other users are not actively viewing the system's automatically created virtual spaces, one user who is watching can easily prompt communication and share resources with people having similar interests through the system. This functionality will be better understood upon a review of the figures that follow.

3D virtual spaces are often used for entertainment, but have historically been a distraction when used for productivity. Given a 3D virtual world with avatars representing people, and given that those avatars automatically react to actions accomplished by the people they represent, a 3D virtual space can be automatically created based upon the person's actions and populated with resources associated to those actions. Here, the specification discloses such a system. In accordance with the systems, people performing similar actions can be grouped into the same dynamic virtual space, thus allowing them to find each other, communicate and share knowledge or problem-solve collaboratively. Information on what actions the user is performing can be gained by most any usual means available—e.g., a local process monitoring the user, a server keeping track of server requests, environmental sensors tracking position, tone of voice, or even vocal content, among others. Whatever information is available can be used, and the more information that is available, the better fit can be achieved when creating (and/or reconfiguring) the virtual environment. Essentially, this specification describes systems and methods that enable production of synthetic (e.g., virtual) spaces and office environments that support dynamic sharing and serendipitous interaction using the disclosed collaboration and communication infrastructure and applications.

As shown in FIG. 1, the virtual workspace management system 104 can include a resource binding component 106 and a dynamic rendering component 108. Together, these components facilitate dynamic (e.g., real-time) presentation of virtual spaces together with relevant or associated resources. As used herein, 'resources' are to include most any enterprise or activity information (or representations thereof) including, but not limited to, data, work-product files, applications, sources, contacts, artifacts, etc.

The resource binding component 106 can automatically or dynamically gather, collaborate and/or aggregate resources and thereafter bind the resources to an appropriate virtual space. Effectively, the resource binding component 106 can locate resources associated to (or relevant to) an activity, or enterprise workflow, based upon content, contacts or context. By way of example, the system can determine content of an activity or context associated with an activity and automatically locate (and bind) resources to a virtual space. More particularly, in addition to data and applications, the system can dynamically bind users in a real-time fashion such that the immersive collaborative display 102 can establish a true-to-life experience in which a group of users can collaborate, communicate and share information.

The dynamic rendering component 108 can configure or otherwise arrange resources in accordance with the activity or state of the activity. As situational characteristics change, the dynamic rendering component 108 can automatically (e.g., in real-time) bind users and present resources via a display such as a computer monitor, smart-phone, cell phone, television, personal digital assistant (PDA), etc. By dynamically altering the virtual display, the dynamic rendering component 108 establishes a virtual environment that promotes resource collaboration between users or members of a particular activity or situation. In addition to facilitating multiple users with collaboration and sharing of relevant resources, the system 104 can also dynamically provide a single user with relevant resources as they become available. For instance, as data becomes available (e.g., generated by application or other users), the immersive collaborative display 102 can be automatically updated to convey, represent or otherwise make the data available to the user (or groups of users). In other words, in order to further personalize a viewer experience, the system 104 can filter resources based upon factors such as, but not limited to, user knowledge, preference, policy, role, responsibilities, participation, etc.

Within the immersive collaborative display 102, users can be represented by avatars or other digital representations. These 'avatars' can include visual cues which convey characteristics of a particular user. For instance, an avatar can be displayed in a specific color which denotes 'do not disturb' thereby enabling the user to monitor a space without actively participating. These cues can be most any cue, including but not limited to auditory or proximity cues.

Effectively, the system 104 enables a user (or an avatar representation) to be shown as online while conveying a desire not to be bothered or interrupted. Here, the avatar can be present in a virtual space in order to passively monitor activity while prohibiting interaction or interruption. In other aspects, desired levels of permitted interruption can be set and thereby represented in the virtual space. Information gathered from sensory technology can be used to automatically establish (or infer) an avatar's desire not to be interrupted. In operation, policies can be used, and inferences made, to establish a desire not to be interrupted in selected contexts.

Similarly, facial cues, gestures and other visual cues can be used to determine a desire not to be bothered. As well, gestures and the like can be normalized to account for local custom or the like. A desire not to be interrupted can be mapped to a user interface (e.g., virtual workspace) in most any number of manners. For example, an avatar can be depicted wearing headphones, behind a closed door, wrapped in a shroud, in a select color (e.g., red), or the like.

In other aspects, user and/or device state can be used to determine and/or infer a desire not to be interrupted. As well, to a viewer, the visual cues can be conveyed differently depending on the device type and/or capabilities. For example, one device may simply change an avatar's color to convey a desire not to be bothered while another device may display the avatar with a shroud or with headphones on to convey the same message. The dynamic rendering component 108 can automatically establish an appropriate rendering in view of context or state within an activity.

Referring again to FIG. 1, system 100 can dynamically populate and reconfigure an immersive collaborative display 102. While conventional systems required proactive entry by users, the subject specification describes and discloses a system 100 which automatically populates the immersive collaborative display 102 with user representations together with other resources associated with an activity or task. In other words, in addition to enabling manual or proactive entry, the system can dynamically monitor users and/or resources to thereafter populate a virtual space.

Given a 3D virtual world with avatars representing people, the system 100 can observe each user's behavior, their interests, their current activity, their actions, their role, etc. Accordingly, the system 100 can create a space appropriate for the avatars. Within this virtual space, the system 100 can mimic each user's real-world actions in the virtual space by dynamically reconfiguring the space as well as the representations (e.g., avatars) in view of real-time actions.

In other words, a group of users interested in or working on a similar project can be represented by avatars (or other representations) in the space. Thus, each user can visually identify other users with similar interests and actions. In addition to promoting collaborative work product, these avatars can be used to quickly launch communications between users via phone, email, chat, etc. Essentially, user intervention need not be required—rather, the system 100 can dynamically render user representations based upon activity, project, task, etc. Even if the all users are not actively viewing the system's automatically generated virtual spaces, one user who is watching can communicate with people of similar interests through the system 100 as desired.

With continued reference to FIG. 1, system 100 includes a virtual workspace management system 104 which enables dynamic aggregation or consolidation of user representations via immersive collaborative display 102. While many of the embodiments described herein are directed to aggregation or consolidation of avatars, most any digital representation of a user can be employed in connection with the features, functions and benefits of this specification. For example, still images, textual representations, etc. can be used to represent a user within a virtual space. Still further, enhancements such as shading, coloring, sizing, additional features (e.g., halo), sounds or the like can be used to convey context, preferences, role or state of a user within the virtual space. By way of specific example, a user that is associated with an activity that corresponds to the space who is not logged into the system can be shown as a ghost or other designated character.

As illustrated in FIG. 1 and as described supra, the virtual workspace management component 104 can include a resource binding component 106 and a dynamic rendering component 108 which together facilitate identification, collaboration and display of user representation related to an activity or context. Still further, these components (106, 108) can also facilitate conveyance of other resources (e.g., data, applications) associated to an activity or state within an activity workflow.

While many of the aspects and embodiments described herein are directed to business or enterprise workflows, it is to be understood that most any activity- or subject-based aggregation can effected by way of the virtual workspace management system 104. For instance, system 100 can be employed to enable a group of users interested in a sporting event to be placed within the same virtual environment to view a specific event. As will be understood, within the virtual environment, users can collaborate, share ideas and commentary, share comments, and enjoy the sporting event within a virtual environment. In a particular example, the virtual space can be game room having a virtual plasma display where users (or avatar representations of users) can gather to share in the enjoyment of viewing the event. In today's digital world, it will be understood that this virtual environment enables users to gather and collaborate without physically relocating. The virtual space can bring people together who otherwise may not be able to physically share company with others.

In effect, the specification can provide a social network to share information and rich experiences within a virtual space. In accordance therewith, a social network (e.g., chat network) can be incorporated within a virtual room or space that enables users to discuss activity within the particular room while dynamically updating the virtual representations in real-time. As described above and herein, these social networks can be customizable based upon context, role, identity or the like. Similarly, authorization to join or partake can be granted or denied based upon similar factors and criteria. Moreover, in order to enhance communication, cultural nuances can be normalized and/or standardized. It will be appreciated that this can assist to alleviate and/or overcome language and custom barriers as well as to make localized gestures generic in nature. These concepts enhance the ability to have open 'water cooler' discussions regardless of physical location or the like.

Figure 2:
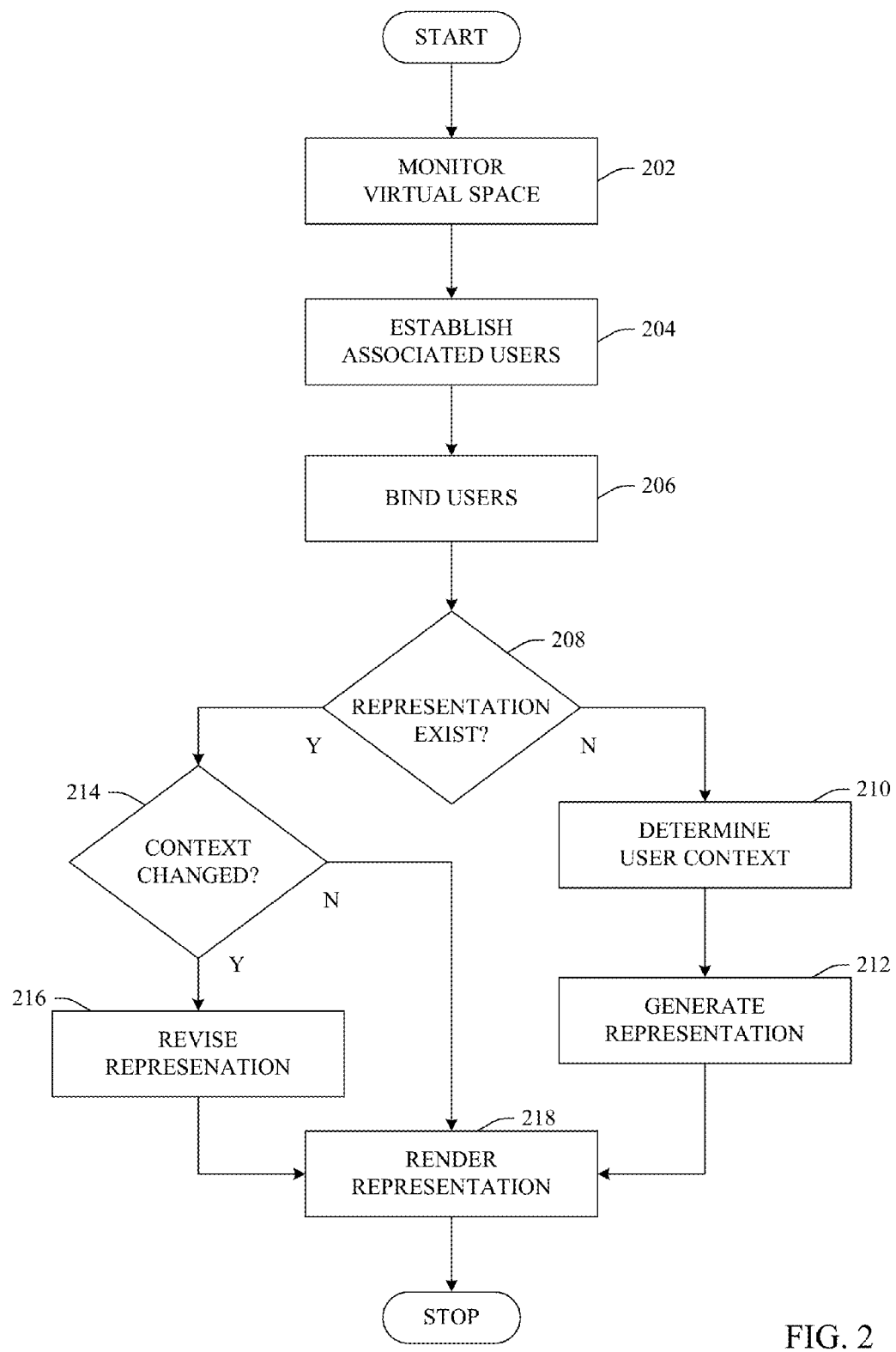
FIG. 2 illustrates an example flow chart of procedures that facilitate binding users within an immersive collaborative environment in accordance with an aspect of the disclosure.

FIG. 2 illustrates a methodology of dynamically updating and binding user representations to an immersive collaborative display in accordance with an aspect of the specification. Generally, the methodology of FIG. 2 describes acts associated with binding users to a virtual space in accordance with the immersive collaboration features, functions and benefits described herein. In addition to binding the users (or representations thereof) to a virtual space, the methodology of FIG. 2 also describes acts of updating the virtual display in real-time (or near real-time).

While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

At 202, a virtual space can be monitored, for example, interactions between users within the space can be monitored. It is to be understood that the methodology of FIG. 2 presumes that a virtual space is pre-established in accordance an activity, work-flow, business project or the like. In other words, a virtual space can be established and populated with resources (or representations of resources) associated with the activity, work-flow or business project. As interactions and communications take place, the space can be monitored at 202. For example, content of conversations can be analyzed to determine topic, subject or state of an activity within a space. Similarly, data and other resources that correspond to the virtual space can also be identified at 202.

At 204, associated users can be established or identified as they relate to the context of the virtual space, or activities within the space. As well, these users can be identified as they relate to the associated data or to contacts of those users already within the space. It is to be understood that most any criteria can be used to establish associated users. In other words, most any preference, inference, policy, etc. can be employed to determine users associated (or relevant) to a virtual space.

The users can be bound to the space at 206. Here, as users relate to the contacts, context or content of the virtual space, the users (or representations thereof) can be bound to the space. In other words, the users can be tagged or otherwise linked to the particular virtual space based upon their relevance (determined or inferred) to the space or activity associated therewith. Thus, a representation of each of the bound users can be rendered within the virtual space. In other words, a real-time rendering of a user that coincides with their real-world activities and context can be rendered.

A determination is made at 208 to establish if a representation of the user, or group of users, exists within the virtual space. If not, at 210, the context of the user is determined at 210. In other words, a user's relevance, state, role, etc. related to the virtual space as well as to other users within the space can be determined. Based upon this information, a representation (e.g., avatar) of the user can be established at 212. As described supra, the representation can convey relevance (e.g., identity, role) to the activity as well as personal preferences (e.g., do not disturb).

If, at 208, the determination reveals that a representation of the user already exists within the virtual space, at 214, a determination can be made (or inferred) to identify if the user's context has changed. If so, at 216, the representation can be revised to correspond to the user's context or state within the activity or work-flow. Once, the representation is generated at 212, revised at 216 or determined to be current at 214, the representation is rendered at 218. Here, the representation can be rendered in real- or near real-time thereby conveying an actual status or context of an activity as well as each user's participation and interactions within the virtual activity space. As described above, it is to be understood that this representation can be conveyed based upon a perspective of a particular viewer thereby personalizing the user experience.

Figure 3:
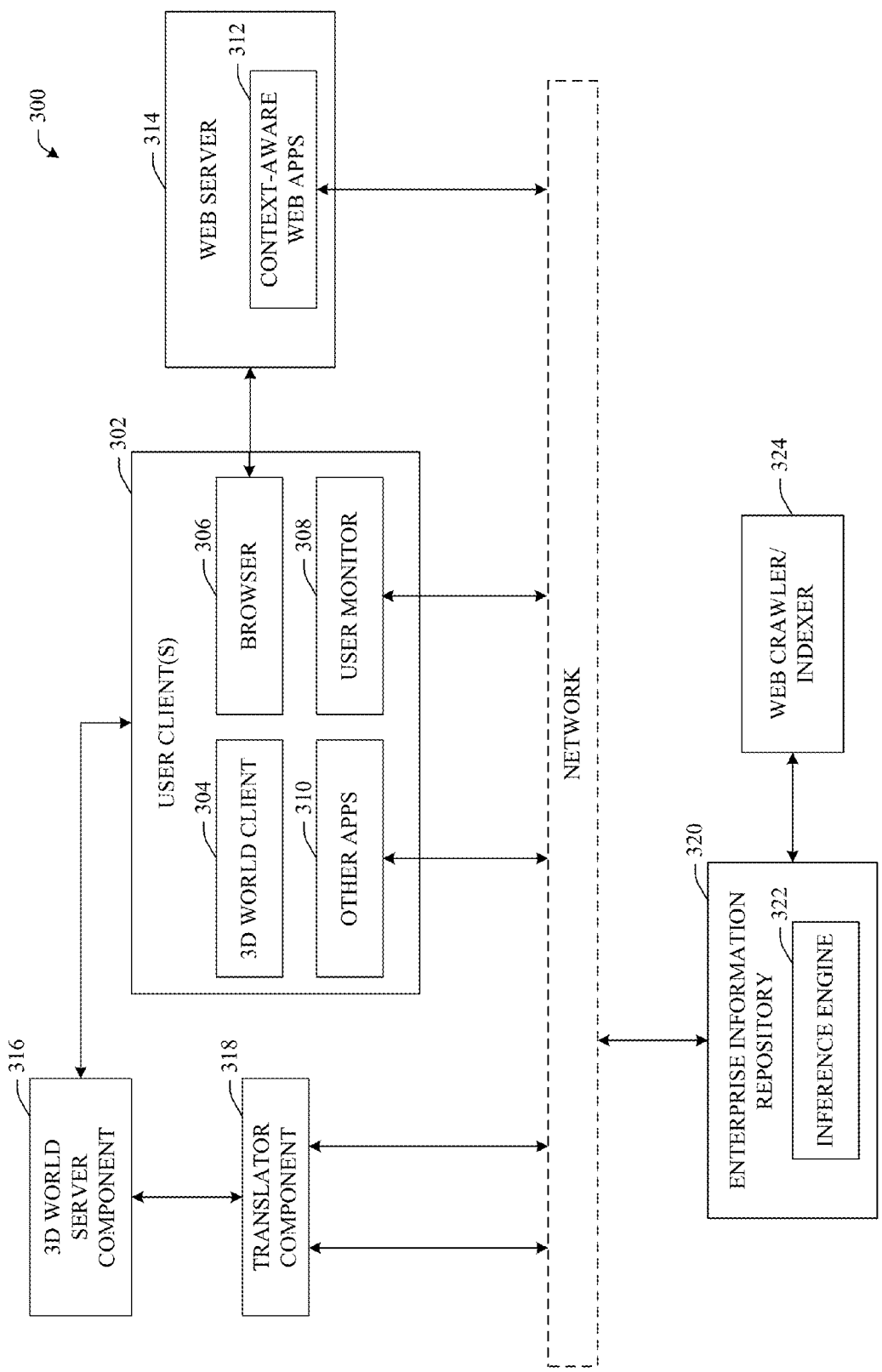
FIG. 3 illustrates a block diagram of a high-level component system that facilitates immersive collaboration in accordance with embodiments of the specification.

Referring now to FIG. 3, an example high-level block diagram of an immersive collaboration system 300 in accordance with an aspect of the specification is shown. While specific components are illustrated in FIG. 3, it is to be understood that alternative systems can be configured that possess the features, functions and benefits described herein. Thus, system 300 is included to add perspective to the specification and is not intended to limit the specification in any manner.

User clients 302 can include a 3D world client 304, a browser 306, a user monitor 308 and other applications 310. In operation, the user monitor 308 can observe contextual factors, including user context, activity context and environmental context. In accordance with a detected context, the 3D world client component 304 can render users and resources associated with such context. For example, links to other applications 310 can be provided by way of the 3D world client 304. Similarly, the browser 306 can be employed to provide access to context-aware web applications 312 employed within a web server 314.

A server-based 3D world server component 316 and translator component 318 can be provided as needed or desired to provide web based immersive collaborative features, functions and benefits. Still further, in accordance with the context, resources can be accessed by way of an enterprise information repository 320. Additionally, an inference engine 322 and web crawler/indexer 324 can be employed to assist in identification of relevant resources (e.g., data, people, links). For instance, based upon statistical and/or historical analysis and heuristics, the inference engine 322 can establish relevance, or degrees of relevance, of the information. The web crawler/indexer 324 can be employed to identify information and other resources located upon a network, for example, the Internet.

As will be understood, system 300 can not only virtualize a user's desktop but, also their workspace as a whole. Essentially, the system can determine or infer where a user is located, what they are doing, what they are using, and who they are communicating with and automatically render a 2D, 2½D or 3D immersive collaborative display. Generally, the specification fuses content, contacts and context in a manner that enables an immersive collaborative environment traditionally reserved for 3D gaming applications.

A single, personalized view of a user's environment can be rendered and made available for others to others to join, work within, etc. The collaboration within this environment essentially makes resources (e.g., tools, data, contacts) available based upon a user's context. In operation, an avatar or other suitable representation can be used to symbolize the user, or group of users, within the virtual space.

Within this virtual space, data can be automatically and/or dynamically filtered and provided based upon most any relevant factors including, user activity, user role, user permission, user contacts in close proximity, etc. Similarly, as the system 300 can make this information available to a user in an effort to maximize efficiency, information from all users within a virtual space (e.g., room) can be saved or tagged in association with the room for subsequent use. As well, information can be stitched together so as to provide a cohesive and comprehensive rendition of the activity with a particular room.

One useful embodiment includes an ability to promote cross sharing of information based upon a particular context. As well, the system 300 can intelligently filter information such that a user is only presented with information useful at any moment in time. This information can be displayed via a virtual desktop which enables a view of real world resources within a technologically savvy virtual space.

Figure 4:
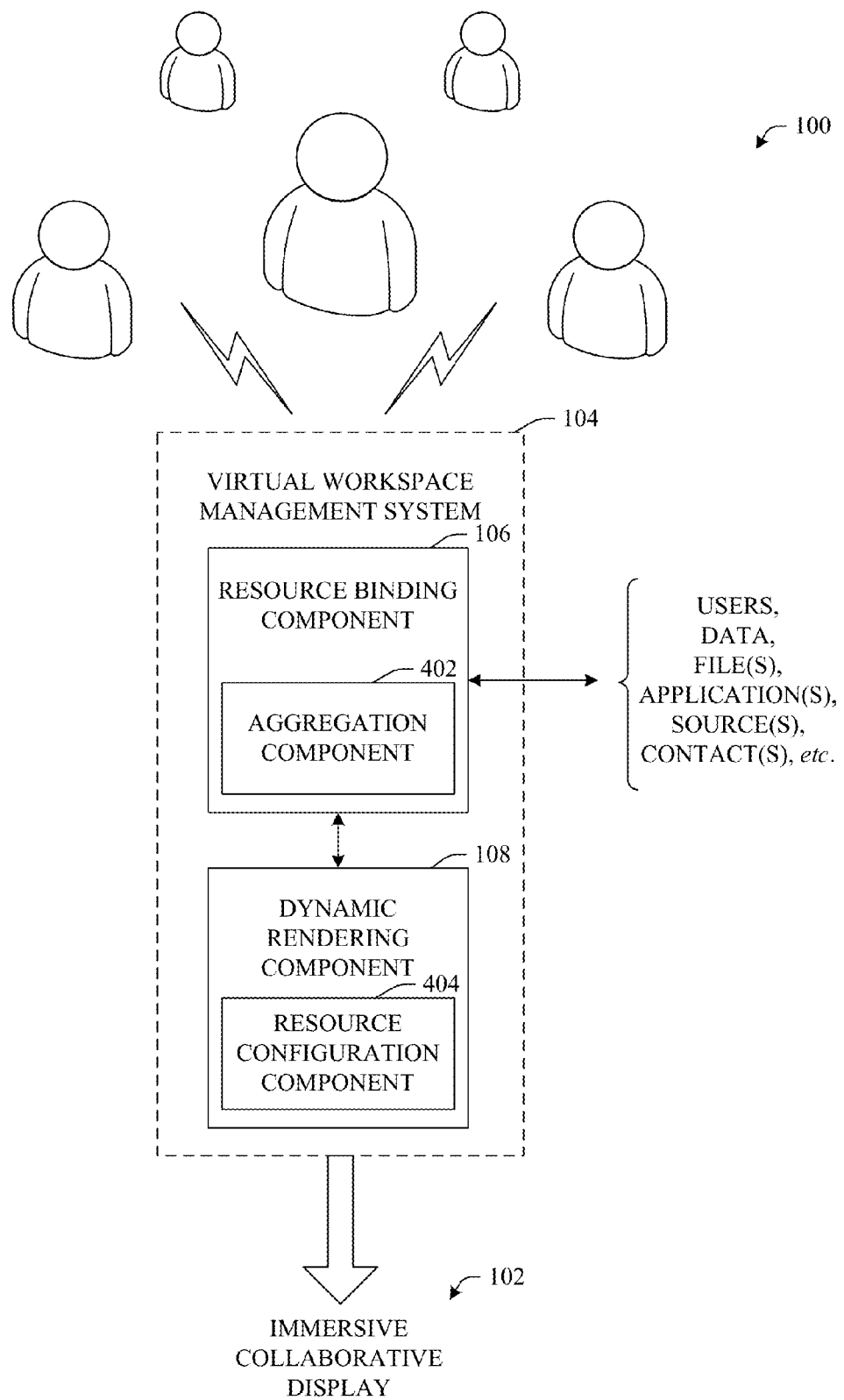
FIG. 4 illustrates an alternative block diagram of a virtual workspace management component that employs resource binding and dynamic rendering components to establish an immersive collaborative display in accordance with aspects of the specification.

Turning now to FIG. 4, an alternative block diagram of system 100 is shown in accordance with aspects of the specification. As shown, the resource binding component 106 can include an aggregation component 402 which identifies relevant users and other resources associated with a virtual space. The relevant users are bound to the virtual space such that the space can be dynamically updated in real- or near real-time.

The dynamic rendering component 108 can include a resource configuration component 404 which establishes a user representation that corresponds to the virtual space. In addition to establishing an appropriate representation, the resource configuration component 404 can also apply effects and orientation in accordance with the activities within the virtual space. Each of these components will be described in accordance with the figures that follow.

Figure 5:
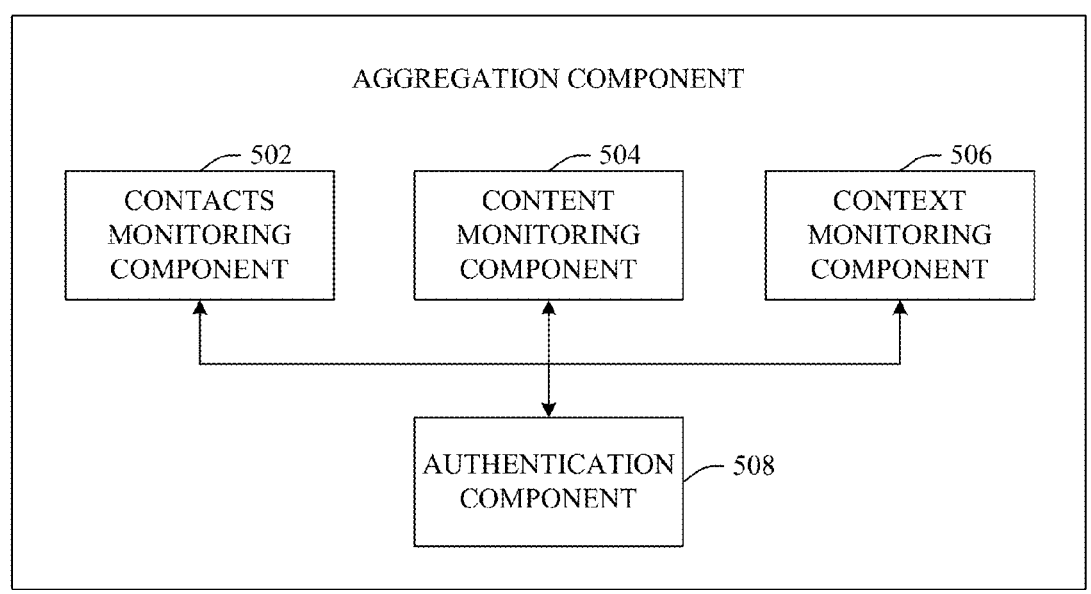
FIG. 5 illustrates an example block diagram of an aggregation component that collects contacts, content and context criteria in accordance with aspects of the disclosure.

Referring now to FIG. 5, an example block diagram of an aggregation component 402 is shown in accordance with an aspect of the specification. Generally, component 402 can include a contacts monitoring component 502, a content monitoring component 504 and a context monitoring component 506. Together, these sub-components (502, 504, 506) can gather information related to contacts, content and context respectively, whereby the information can be used to identify, determine or infer relevant users and resources by which to bind to a virtual space.

In one example, the contacts monitoring component 502 can monitor individuals in a room together with their associated contacts (e.g., via ongoing or past interaction, personal information manager (PIM) data . . . ). This information can be used to determine or infer other individuals who may be relevant to actions within the virtual space. Accordingly, an invite can be sent to the users to join or, in other aspects, a representation of the user can be automatically displayed in the event that communication to the user is desired. Here, a representation can be most any type of digital representation including but, not limited to, an image, textual string, avatar, statue, or the like.

In addition, an authentication component 508 can be employed to regulate access to the virtual space. Alternatively, the authentication component 508 can be employed to regulate access to any of a subset of resources within the room. For example, the resources within a virtual space can be displayed and accessed on a 'need-to-know' basis whereby not every user has the same access. Rather, the system is capable of filtering resources based upon an access control list (ACL) or other filtering mechanism thereby limiting exposure to sensitive data and reducing unwanted exposure of sensitive data or resources.

Similar to the action of the contacts monitoring component 502, the content monitoring component 504 can establish substance of actions within a virtual space. This substance or subject determination can be employed to determine or infer relevant individuals or other resources to the theme of the space. In one example, keywords can be gathered to determine or infer a topic within the space. Similarly, topic (or content) in addition to contacts can be used to further determine or identify relevant individuals or other resources.

Still further, a context monitoring component 506 can be employed to identify situational aspects, circumstantial aspects, state or status, perspective, etc. related to the activity or topics within the space. Here, this information can be utilized in combination with or individually to establish relevant users or other resources related to a virtual space. As described supra, once the users and resources have been established (e.g., determined or inferred), the information can be rendered to a user in a real-time manner thereby enhancing a user's ability to interact with data, users and other resources that are relevant to a particular activity or space.

Figure 6:
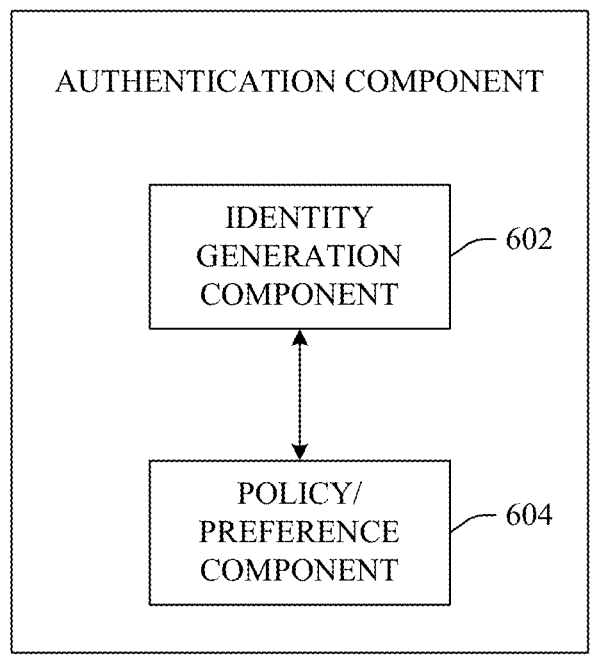
FIG. 6 illustrates an example authentication that authenticates users within a virtual environment in accordance with aspects of the specification.

FIG. 6 illustrates an example authentication component 508 in accordance with an aspect of the specification. The authentication component 508 can include an identity generation component 602 and a policy component 604. In operation, the identity generation component 602 can be used to establish a particular 'identity' of a user. Here, it is to be understood that 'identity' can refer to a digital identity or physiological identity of a user. For example, biometric mechanisms can be used to establish physiological identity of a user.

Additionally, identity can include organizational role, acting capacity, etc. For example, a user's professional capacity or 'identity' on one project might be lead programmer while, on a separate project, their capacity or 'identity' might be reviewer. Here, as 'identity' is determined, a policy component 604 can be employed to grant or deny access to a virtual space as a whole. As well, the policy 604 can be employed to restrict or filter access to information within the virtual space. For example, based upon a particular 'identity' certain resources can be masked from view of the user.

Figure 7:
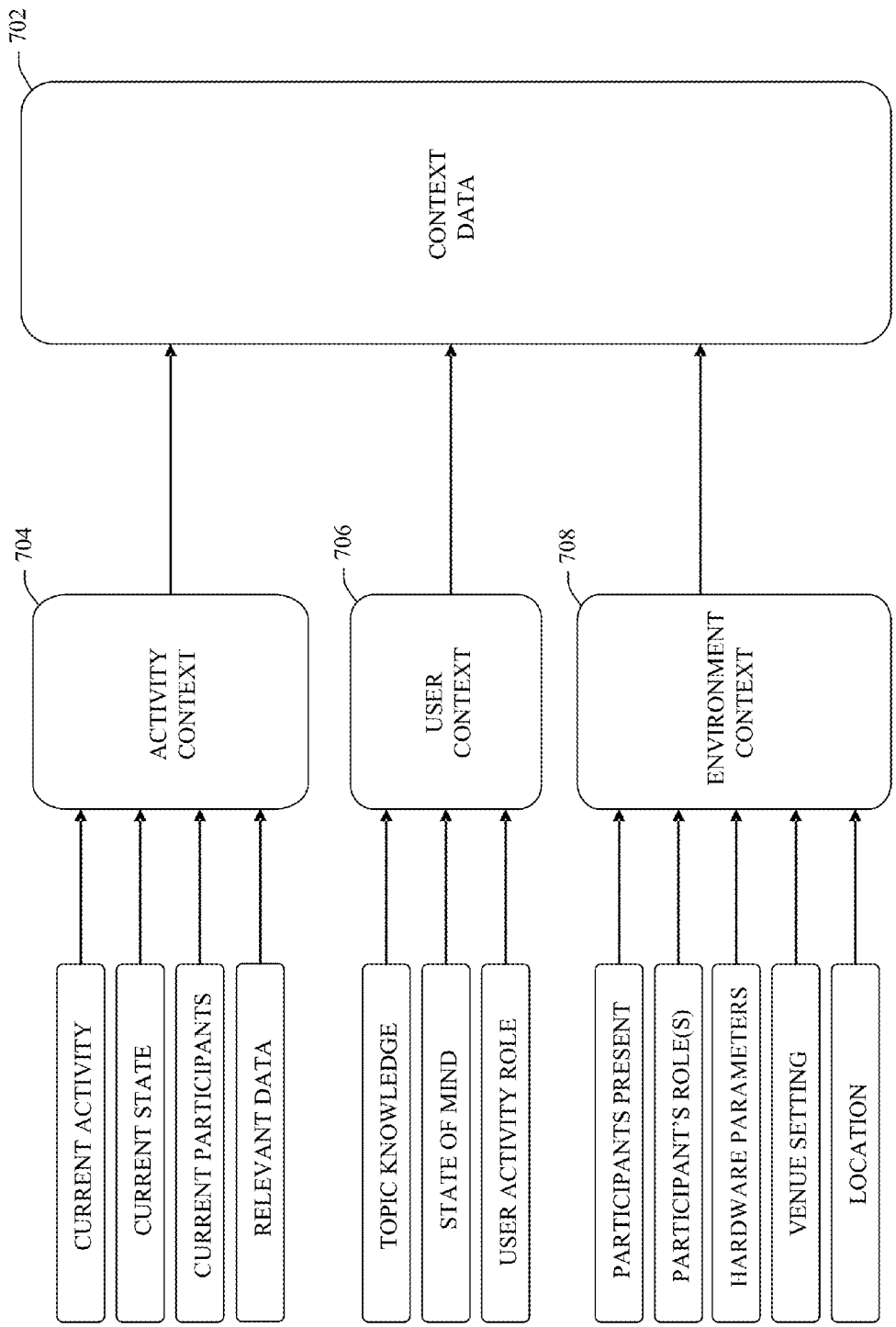
FIG. 7 illustrates an example set of context data that is employed to establish an immersive collaborative display in accordance with an aspect of the specification.

FIG. 7 illustrates an example set of contextual data that can be captured in accordance with embodiments of the specification. As shown in FIG. 7, the context data 702 can be viewed in three 3 separate categories. Namely, the context data 702 can be divided into activity context 704, user context 706, and environment context 706. It is to be understood that FIG. 7 is provided to add perspective to the features, functions and benefits and is not intended to limit the scope of the specification in any manner. Rather, it is to be understood that other categories of data can be incorporated into the context data 702 without departing from the scope of this disclosure and claims appended hereto.

By way of example, and not limitation, the activity context data 704 can include the current activity of the user (or group of users). It is to be understood that this activity information can be explicitly determined and/or inferred, for example, by way of machine learning and reasoning (MLR) mechanisms. Moreover, the activity context data 704 can include the current status or state (if any) within the activity. The activity context data 704 can also include a list of current participants associated with the activity as well as relevant data (or resources) associated with the activity.

In an aspect, the user context data 706 can include knowledge that the user has about a particular topic associated with the activity. As well, the user context data 706 can include an estimate of the user's state of mind (e.g., happy, frustrated, confused, angry, etc.). The user context 706 can also include information related to the user's role within the activity (e.g., leader, manager, worker, programmer). It will be understood and appreciated that this user activity role information can be used to categorize relevant resources by which to present to the user in a virtual environment. With reference to the user state of mind, it will be understood and appreciated that the user's state of mind can be estimated using different input modalities, for example, the user can express intent and feelings, the system can analyze pressure and movement on a mouse, verbal statements, physiological signals, etc. to determine state of mind.

With continued reference to FIG. 7, the environment context data 708 can include information such as, but not limited to, participants present, participant's roles, hardware parameters, venue setting, location, etc. In an example, the venue setting can be employed to determine if the user is in a business meeting, what type of display technology is available (e.g., overhead projector). As described above, although specific types are identified in FIG. 7, it is to be understood that additional types of information can be included within the context data 702. Accordingly, it is to be understood that this additional data is to be included within the scope of the disclosure and claims appended hereto.

Figure 8:
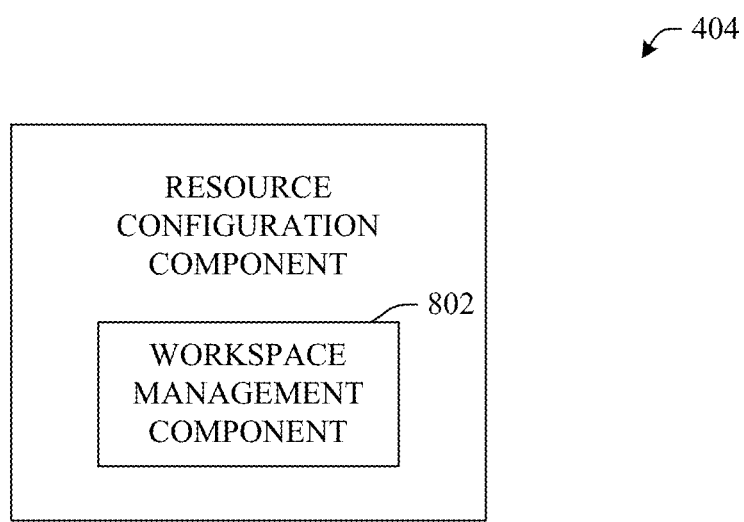
FIG. 8 illustrates an example configuration component in accordance with an embodiment of the specification.

FIG. 8 illustrates an example resource configuration component 404. While the resource binding component (106 of FIG. 1) and the aggregation component (402 of FIG. 4) enable consolidation of relevant users and other resources related to a virtual space and corresponding activity, the resource configuration component 404 enables these resources to be rendered in a useful and meaningful manner. The configuration component 404 can establish an appropriate representation of a user or other resource whereby a workspace management component 802 can be employed to optimize screen real estate, display characteristics, bandwidth restrictions, etc.

In one example, the workspace management component 802 can be employed to determine characteristics of a target device and corresponding display. Thus, the workspace management component 802 can maximize screen real estate by sizing or arranging resources in accordance with available space. This workspace management functionality will be better understood upon a review of the two- and three-dimensional screen displays of FIGS. 10 and 11 that follow. An example workspace management component 802 is illustrated in FIG. 9 that follows.

Figure 9:
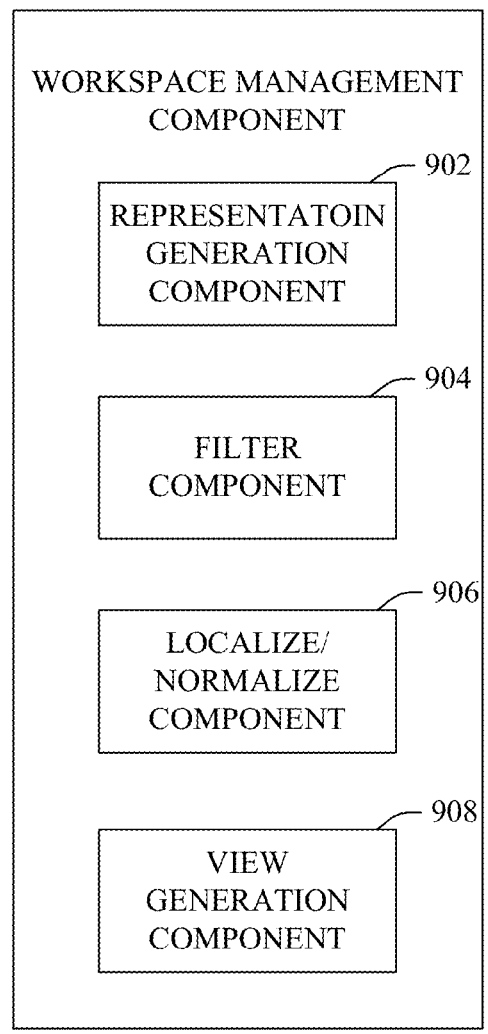
FIG. 9 illustrates an example workspace management component that regulates output of the immersive collaborative display in accordance with aspects.

Referring to FIG. 9, the example workspace management component 802 is shown to include a representation generation component 902 that can establish an appropriate user or other resource representation based upon most any factor including but, not limited to, relevance, real estate, type of resource, etc. For instance, an active participant can be represented by a life-like avatar whereas a participant that is merely monitoring actions within the space can be represented as a ghost or other semi-transparent avatar or digital representation. Still further, users who have authored documents, applications or other resources related to the space can be represented as still images, statues or the like.

A filter component 904 can be employed to filter resources or access to resources based upon personalized factors, for example, preference or 'identity.' Other filtering mechanisms can be employed without departing from the spirit and/or scope of the specification. For instance, parental controls within a virtual space can be implemented by way of the filter component 904. Here, the filter component 904 can limit exposure of sensitive or age-appropriate data as desired. While specific examples are given, it is to be understood that the filter component 904 can be used to filter data based upon most any desired policy, preference or criteria.

The localize/normalize component 906 can be employed to adhere to local customs, language and/or dialect. For example, this component 906 can overcome boundaries associated with foreign language and custom. In one aspect, text and/or spoken words/phrases can be automatically translated into a language comprehendible by a user, e.g., based upon context, policy or preference. As such, the rendering (visual and audible) can be specific to the preferences or limitations of a user.

A view generation component 908 can be employed to configure and/or format a view of the virtual space. As will be seen in and understood upon a review of the figures that follow, this view can be in most any 2D, 2½D or 3D layout as desired or appropriate. While specific displays or pages are illustrated, it is to be understood that these example screens are provided to add perspective to scope of the features, functions and benefits of the specification and are not intended to limit the specification in any manner. Rather, the examples set forth are but two embodiments of views in accordance with aspects of the specification.

Figure 10:
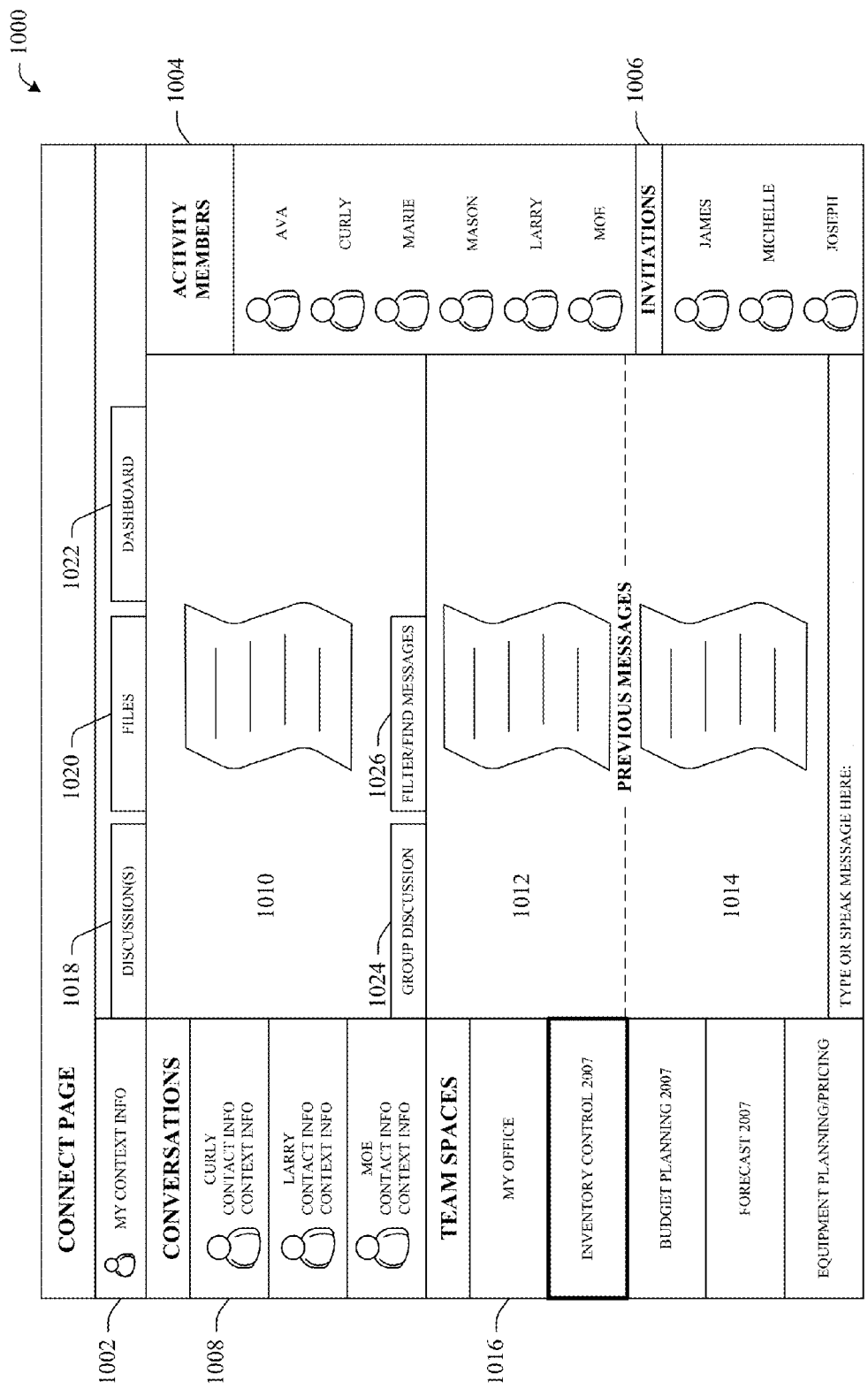
FIG. 10 illustrates an example two-dimensional (2D) immersive collaborative page in accordance with an aspect of the disclosure.
Figure 11:
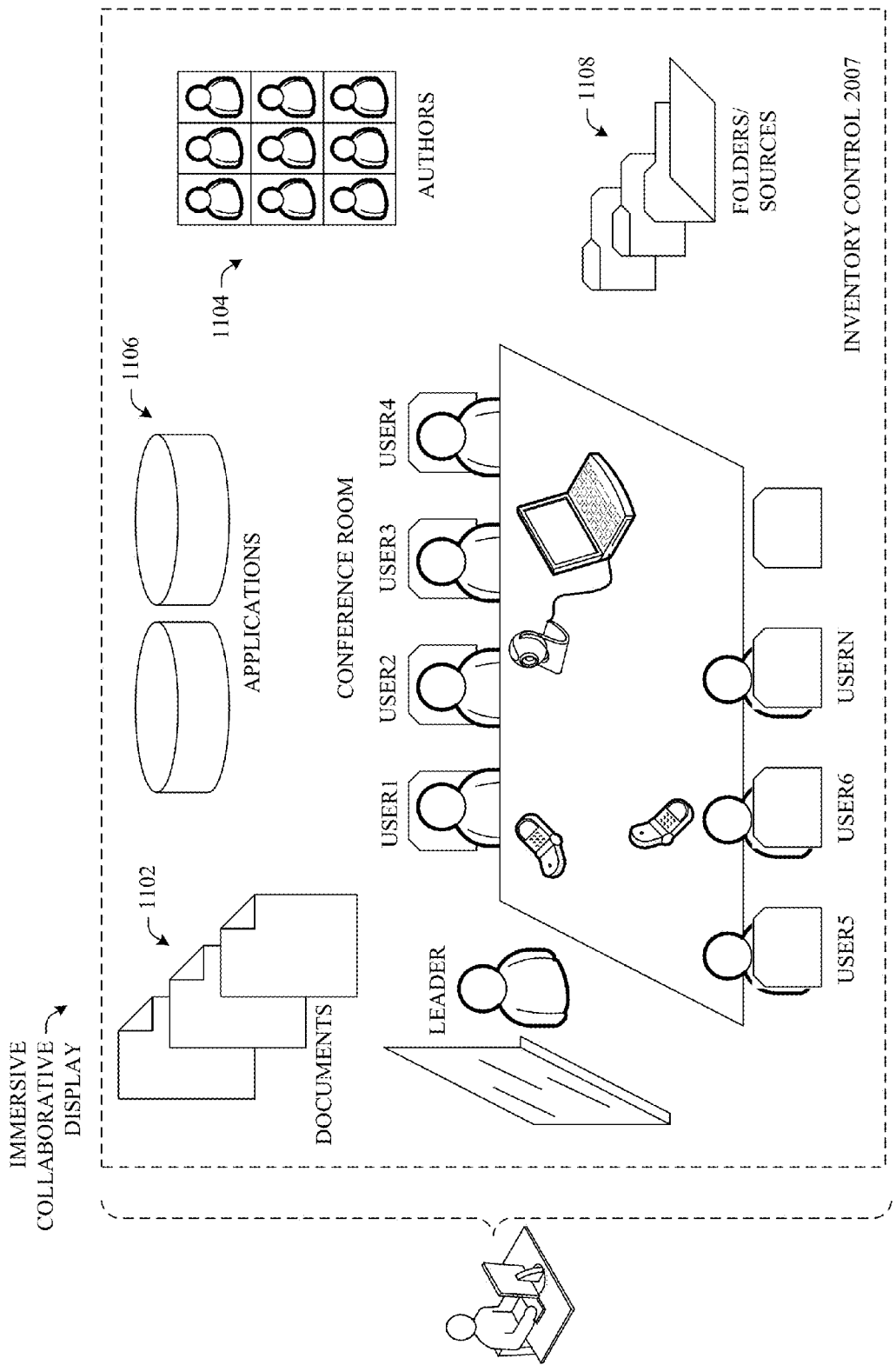
FIG. 11 illustrates an example three-dimensional (3D) immersive collaborative display in accordance with an aspect of the specification.

Turning now to FIGS. 10 and 11, example 2D and 3D immersive collaborative displays or pages are illustrated respectively. While example screens are shown, it is to be understood that alternative pages can be employed to illustrate the features, functions and benefits of the specification without departing from the scope of the disclosure and claims appended hereto. For example, alternative resources can be included, resources can be excluded as well as resources can be configured or represented in a different manner than those shown in FIGS. 10 and 11 respectively.

In each of the following example screen pages, it will be understood that the users and/or information displayed within the immersive collaborative display can be aggregated in real-time and dynamically displayed in accordance with contextual information. For instance, as a user's state changes within an activity, the information made available by the collaborative display dynamically alters to present the user with useful and relevant resources associated with the activity. Additionally, as additional users become available or associated with context of a virtual space, these users (or representations thereof) can be dynamically added to the space and made available to other users of the space. As will be understood, the dynamic presentation of users and/or resources in accordance with the context can enhance the user experience thereby increasing efficiency, communications and productivity.

Referring first to FIG. 10, illustrated is a 2D view 1000 of a wiki-style page associated with a current activity of a user. This view 1000 dynamically binds users and aggregates a multiplicity of resources associated with an activity into a single place, the page 1000 together with corresponding sub-pages or folders. While a specific set of users and resources are illustrated and discussed herein, it is to be understood that alternative aspects can include a disparate set of users or resources without departing from the spirit and/or scope of this specification.

An identifier of the page is located at 1002. Here, this information can define a current context of the user or 'owner' of the page. For instance, contextual information can include current activity, current location, current role, etc. This information assists in setting perspective of the association of the displayed resources.

As described above, a representation of members or individuals associated with an activity can be presented, and dynamically altered in real-time. On the example page 1000, this representation is illustrated at 1004. It is to be understood that most any method of emphasis (or de-emphasis) can be employed to highlight or otherwise detract attention to a member or group of members. For example, representation types can change based upon relevance, role, availability, etc. Still further, coloring, shading, sizing, etc. can be used to enhance (or de-emphasize) visibility of a subset of activity members 1004.

A user can 'invite' to launch a communication session with an activity member illustrated in 1004. The communication session can employ most any available protocol known including, but not limited to, IM (instant message), email, SMS (short message service), MMS (multi-media messaging service), VoIP (voice-over-Internet Protocol), conventional cell or landline service, etc. Pending invitations are shown at 1006—in other words, as a user invites another user to engage in a communication session, identity of these users can be displayed in area 1006.

Once a communication session has commenced, the on-going conversations can be shown at 1008. Here, in addition to the identity of the on-going conversations, contact and context information can be displayed for each of the users. For example, each user's IM name, current role, etc. can be displayed in area 1008. One-on-one, group discussion and previous messages (history) can be displayed at 1010, 1012, and 1014 respectively.

Area 1016 can be used to display team spaces, for example, 'My Office,' 'Inventory Control 2007,' 'Budget Planning 2007,' 'Forecast 2007,' 'Equipment Planning/Pricing.' In the example of FIG. 10, as illustrated, 'Inventory Control 2007' is selected from the list of example team spaces 1016. Accordingly, the users and resources displayed on the page 1000 dynamically correspond to the particular team space. As the user toggles between the team spaces, the user resource representations displayed on the page 1000 will dynamically change in accordance with the particular space selected. As well, if desired, it will be understood that multiple spaces can be selected at any one time thus, the page 1000 will display users and resources that correspond to each of the spaces.

Additionally, as described herein, users can be dynamically bound to the page 1000 in real- or near real-time as they are linked to the context of the page. Accordingly, appropriate representations can be displayed in accordance with relevance, activity, etc. For instance, some users can be emphasized while others are de-emphasized in accordance with context or state as a function of an activity linked to a virtual space.

Returning to the list(s) of messages, the page can include a 'Discussion(s)' folder, 'Files' folder and a 'Dashboard' folder, illustrated by 1018, 1020 and 1022 respectively. Essentially the Discussions folder enables illustration of current and past discussions (and messages). Here, a 'Group Discussion' folder 1024 can be provided to show group discussion(s) in area 1012. Additionally, a 'Find/Filter Messages' folder 1026 is provided and enables a user to search discussion(s) and/or messages based upon most any criteria, for example, sender, subject, keywords, date, time, etc.

The 'Files' folder 1020 provides a listing of data and other documents related to the current context or activity (as selected in area 1016). Additionally, the 'Dashboard' folder 1022 provides a quick view of active resources associated to the user in a particular space or context. For example, the 'Dashboard' folder 1022 can display open applications, files and conversations associated with a specified space.

While specific resources together with a specific layout of those resources are illustrated in FIG. 10, it is to be understood and appreciated that most any associated and/or relevant resources can be represented in the immersive collaborative display. As well, most any layout, orientation, configuration or representation can be employed without departing from the spirit and/or scope of this specification and claims appended hereto.

Turning now to FIG. 11, a 3D rendering of a 'room' or 'space' is shown in accordance with an aspect of the specification. Essentially, it is to be understood that the features, functions and benefits described herein can integrate the concepts of a 2D wiki-style page (FIG. 10) together with an immersive 3D rendering (virtual world) (FIG. 11). As shown in FIG. 10, an ordinary wiki-style page can be described as a dynamic web site made up of pages that can be created and edited by (or on behalf of) end-users using a simple text markup facility. It is to be understood that the wiki-style page of FIG. 10 (as well as the 3D rendering of FIG. 11) can be dynamically created by the system on behalf of the user. By integrating this functionality with a virtual world server, the ideas present a dynamic world made up of 'rooms' or 'spaces' that can be created and edited by end-users (or on behalf of a user). In accordance with the specification, the spaces can be populated in real- or near real-time by users associated with the context of the virtual space.

It is to be understood that the ideas offer both a 2D web-browser wild-like text view of the virtual world (FIG. 10) and an immersive 3D view of the virtual world (FIG. 11). Both views can be dynamically updated (e.g., using 'push' technologies) to show real- or near real-time changes occurring in (or about) the room. Additionally, 'pull' technologies can be employed in other aspects. In some embodiments, users can easily toggle between the text view in the web browser and the graphical view in the 3D client. As the user browses more rooms (spaces) in the 3D client, the user's associated 'avatar' or representation in the virtual world moves from room to room. Moreover, digital representations of other users or their avatars can be dynamically updated to populate the room in accordance with the context of an activity.

Representations of documents that 'live' in the room can appear as links on the web page; if the user opens such a link, their avatar or other representation can move to stand next to the document in the room. This functionality can be seen in FIG. 11 where the 'Leader' stands next to a projection screen that seemingly displays a presentation slide deck. The web page can also show which users are looking at (or editing) each document. Still further, as illustrated at 1102, the display can illustrate which document (or groups of documents) is open (or linked) within the space. This allows users to see what others are doing in a natural manner, regardless of the client technology they are using. In one aspect, conversations between users can be illustrated by images of cell phones as shown between users 1 and 6 in FIG. 11.

Moreover, authors of data and resources associated with a particular space can be represented within the view. For instance, as seen at 1104, a picture grid of authors is illustrated. Here, a user can click on a desired author thereby initiating communication (e.g., IM, email, SMS, MMS, VoIP) to the selected author. As shown, other resources such as, but not limited to, associated applications 1106 and folders/sources 1108 can be illustrated for ease of access by a user in a particular space.

As described supra, the specification suggests inference in lieu of (or in addition to) explicit decision making. Accordingly, the systems described herein can employ MLR components which facilitate automating one or more features in accordance with the subject specification. The subject specification (e.g., in connection with user selection, aggregation and binding) can employ various MLR-based schemes for carrying out various aspects thereof. For example, a process for determining which users to bind to a space, how to represent a user, when to select a resource, how to represent a resource, how to configure a layout/page, etc. can be facilitated via an automatic classifier system and process.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject specification can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining, a current activity, user or environment context, relevant users and other resources to a current context, when/if to bind a user to a space, appropriate rendition of users and other resources in accordance with a context, appropriate orientation/layout, etc.

Figure 12:
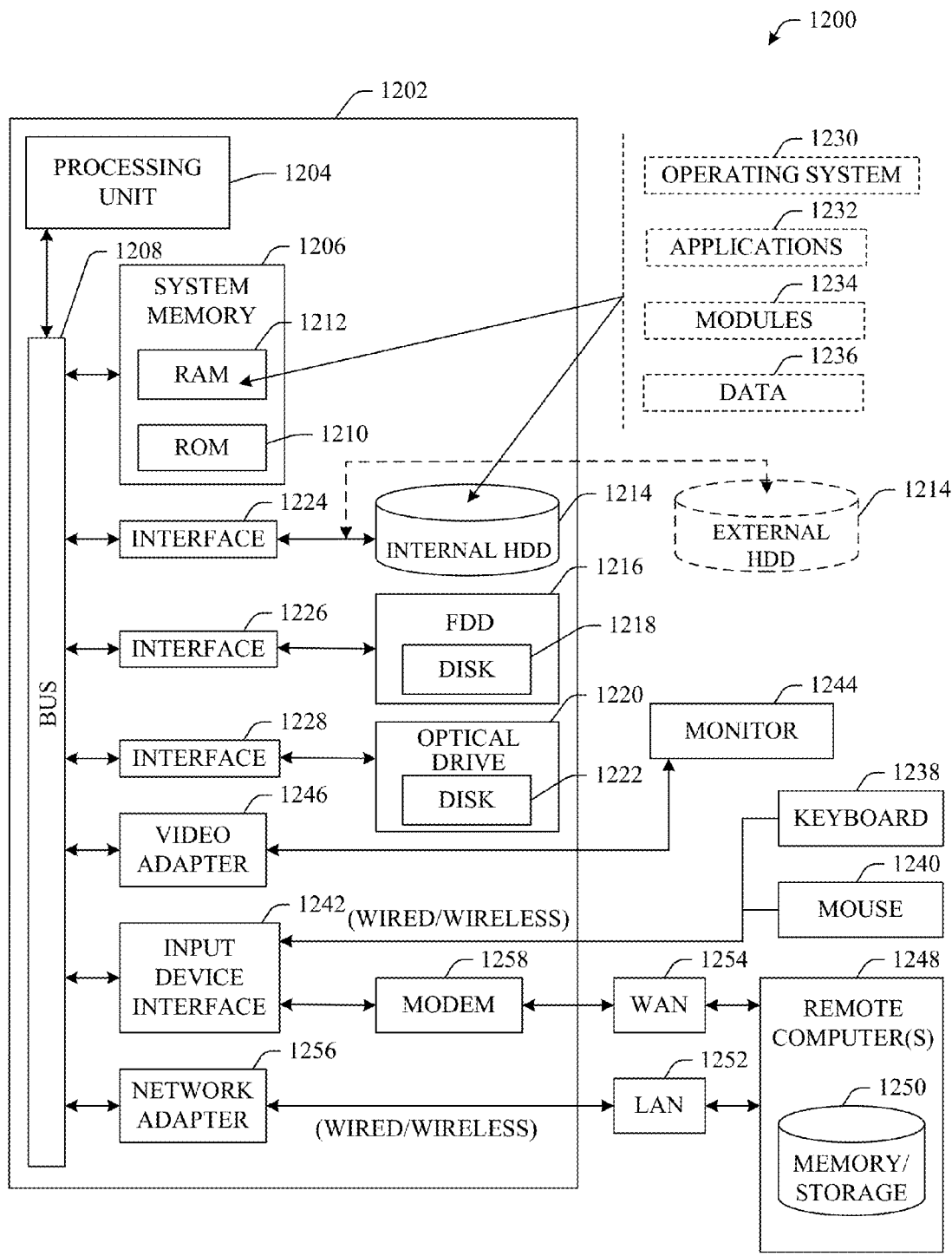
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 13:
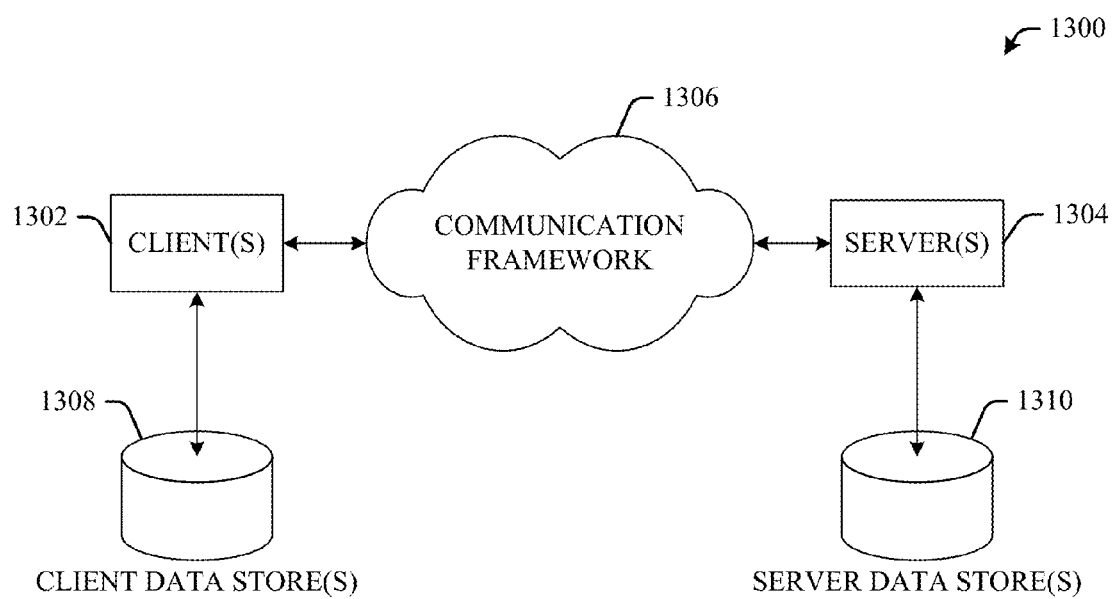
FIG. 13 illustrates a schematic block diagram of an exemplary computing environment in accordance with the subject specification.

Referring now to FIG. 13, there is illustrated a schematic block diagram of an exemplary computing environment 1300 in accordance with the subject specification. The system 1300 includes one or more client(s) 1302. The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
one or more processors;
a resource binding component executable by the one or more processors and configured to detect, based on information from one or more sensors, whether a user wishes not to be disturbed; and
a dynamic rendering component executable by the one or more processors and configured to automatically generate or update a representation of the user within an activity-specific immersive collaborative display to reflect that the user wishes not to be disturbed, wherein the dynamic rendering component automatically generates or updates the representation of the user in a manner that is dependent on a type of device being utilized by a viewer.

2. The system of claim 1, wherein the representation of the user comprises visual cues conveying characteristics of the user.

3. The system of claim 1, wherein the dynamic rendering component is configured to automatically generate or update the representation of the user within the activity-specific immersive collaborative display to reflect that the user wishes not to be disturbed by presenting the representation of the user in a specific color.

4. The system of claim 1, wherein the dynamic rendering component is configured to automatically generate or update the representation of the user within the activity-specific immersive collaborative display to reflect that the user wishes not to be disturbed by presenting the representation of the user wearing a shroud.

5. The system of claim 1, wherein the dynamic rendering component is configured to automatically generate or update the representation of the user within the activity-specific immersive collaborative display to reflect that the user wishes not to be disturbed by presenting the representation of the user behind a closed door.

6. The system of claim 1, wherein the information from the one or more sensors includes cues from the user that are visual or aural.

7. The system of claim 1, wherein the representation of the user comprises an avatar of the user.

8. A method comprising:
at a processor, detecting whether a user wishes not to be disturbed, based on information from one or more sensors; and
automatically generating or updating a representation of the user within an activity-specific immersive collaborative display to reflect that the user wishes not to be disturbed, wherein the automatic generating or updating of the representation of the user is performed in a manner that is dependent on a type of device being utilized by a viewer.

9. The method of claim 8, wherein the representation of the user comprises visual cues conveying characteristics of the user.

10. The method of claim 8, wherein the automatic generating or updating of the representation of the user to reflect that the user wishes not to be disturbed comprises representing the user in a specific color.

11. The method of claim 8, wherein the automatic generating or updating of the representation of the user to reflect that the user wishes not to be disturbed comprises representing the user wearing a shroud.

12. The method of claim 8, wherein the automatic generating or updating of the representation of the user to reflect that the user wishes not to be disturbed comprises representing the user positioned behind a closed door.

13. The method of claim 8, wherein the information from the one or more sensors includes cues from the user that are visual or aural.

14. The method of claim 8, wherein the representation of the user comprises an avatar of the user.

15. One or more computer readable non-transitory storage media encoded with software comprising computer executable instructions that when executed by a processor, cause the processor to:

detect whether a user wishes not to be disturbed, based on information from one or more sensors; and
automatically generate or update a representation of the user within an activity-specific immersive collaborative display to reflect that the user wishes not to be disturbed, wherein the representation of the user is automatically generated or updated in a manner that is dependent on a type of device being utilized by a viewer.

16. The computer readable storage media of claim 15, wherein the instructions that cause the processor to automatically generate or update the representation of the user comprise instructions for:
representing the user having visual cues conveying characteristics of the user.

17. The computer readable storage media of claim 15, wherein the instructions that cause the processor to automatically generate or update the representation of the user comprise instructions for:
representing the user to reflect that the user wishes not to be disturbed by representing the user in a specific color.

18. The computer readable storage media of claim 15, wherein the instructions that cause the processor to automatically generate or update the representation of the user comprise instructions for:
representing the user to reflect that the user wishes not to be disturbed by representing the user wearing a shroud.

19. The computer readable storage media of claim 15, wherein the instructions that cause the processor to automatically generate or update the representation of the user comprise instructions for:
representing the user to reflect that the user wishes not to be disturbed by representing the user positioned behind a closed door.

20. The computer readable storage media of claim 15, wherein the instructions that cause the processor to detect whether a user wishes not to be disturbed, comprise instructions for:
detecting whether the user wishes not to be disturbed based on cues from the user that are visual or aural.

21. The computer readable storage media of claim 15, wherein the instructions that cause the processor to automatically generate or update the representation of the user comprise instructions for:
representing the user as an avatar.

* * * * *